United States Patent [19]

Bunnell, Sr.

[11] Patent Number: 4,987,175
[45] Date of Patent: Jan. 22, 1991

[54] ENHANCEMENT OF THE MECHANICAL PROPERTIES BY GRAPHITE FLAKE ADDITION

[75] Inventor: Lee R. Bunnell, Sr., Kennewick, Wash.

[73] Assignee: Battelle Memorial Institute, Richland, Wash.

[21] Appl. No.: 275,071

[22] Filed: Nov. 21, 1988

[51] Int. Cl.$^5$ .......................... C08K 7/00; C08K 3/34; C08K 3/04

[52] U.S. Cl. .................................... 524/449; 524/406; 524/420; 524/451; 524/494; 524/496

[58] Field of Search ............... 524/406, 420, 449, 451, 524/494, 496

[56] References Cited

U.S. PATENT DOCUMENTS

| | | |
|---|---|---|
| 1,814,215 | 11/1931 | Hanekop . |
| 3,992,218 | 11/1976 | Suetsugu et al. ............... 106/307 |
| 4,005,183 | 1/1977 | Singer ............................ 423/447.2 |
| 4,013,760 | 3/1977 | Huschka et al. ............... 423/449 |
| 4,076,551 | 2/1979 | Yamada et al. ............... 106/56 |
| 4,177,152 | 12/1979 | Sarrut ............................ 252/2 |
| 4,199,628 | 4/1980 | Caines ............................ 428/35 |
| 4,321,446 | 3/1982 | Ogawa et al. ............... 219/10.49 R |
| 4,388,227 | 6/1983 | Kalnin ............................ 252/510 |
| 4,391,873 | 7/1983 | Brassell et al. ............... 428/297 |
| 4,404,315 | 9/1983 | Tsukagoshi et al. .......... 524/527 |
| 4,414,142 | 11/1983 | Vogel et al. ................... 252/506 |
| 4,471,085 | 9/1984 | Yamamoto et al. ........... 524/449 |
| 4,528,235 | 7/1985 | Sacks et al. ................... 428/220 |
| 4,533,086 | 8/1985 | Junttila .......................... 241/16 |
| 4,533,680 | 8/1985 | Kasuga et al. ................ 524/494 |
| 4,539,301 | 9/1985 | Kaneko et al. ................ 501/99 |
| 4,555,393 | 11/1985 | Sorensen et al. ............. 423/447.1 |
| 4,565,649 | 1/1986 | Vogel ............................ 252/503 |
| 4,572,813 | 6/1986 | Arakawa ...................... 264/29.2 |
| 4,604,276 | 8/1986 | Oblas et al. .................. 423/449 |
| 4,608,192 | 8/1986 | Su .................................. 252/506 |
| 4,704,231 | 7/1987 | Chung .......................... 252/511 |
| 4,729,884 | 3/1988 | Sugiura et al. ............... 423/448 |
| 4,818,782 | 4/1989 | Bissot .......................... 524/449 |
| 4,889,886 | 12/1989 | Wada et al. ................... 524/449 |

OTHER PUBLICATIONS

Abstract of Japanese Publication 58-1748; Silicone Sealing Materials for Civil Engineering and Building; Jan. 7, 1983.

*Primary Examiner*—Lewis T. Jacobs
*Attorney, Agent, or Firm*—Wells, St. John & Roberts

[57] ABSTRACT

Compositions in accordance with the invention comprise a polymer and flake reinforcing material distributed throughout the polymer in an effective amount to structurally reinforce the polymer. Individual flakes of the flake material (a) are less than or equal to 1,000 Angstroms in thickness, (b) have an aspect ratio greater than or equal to 100, and (c) are preferably significantly randomly oriented throughout the polymer. A novel apparatus for shear grinding a platy solid material into such individual flakes comprises a cylindrical shearing drum and a shear grinder received therein. The shearing drum has a longitudinal axis and an internal surface formed about a first predetermined radius of curvature. The cylindrical drum is supported for rotation about its longitudinal axis. The shear grinder has an external surface formed about a second predetermined radius of curvature. The second radius of curvature is slightly less than the first radius of curvature.

19 Claims, 1 Drawing Sheet

U.S. Patent  Jan. 22, 1991  4,987,175
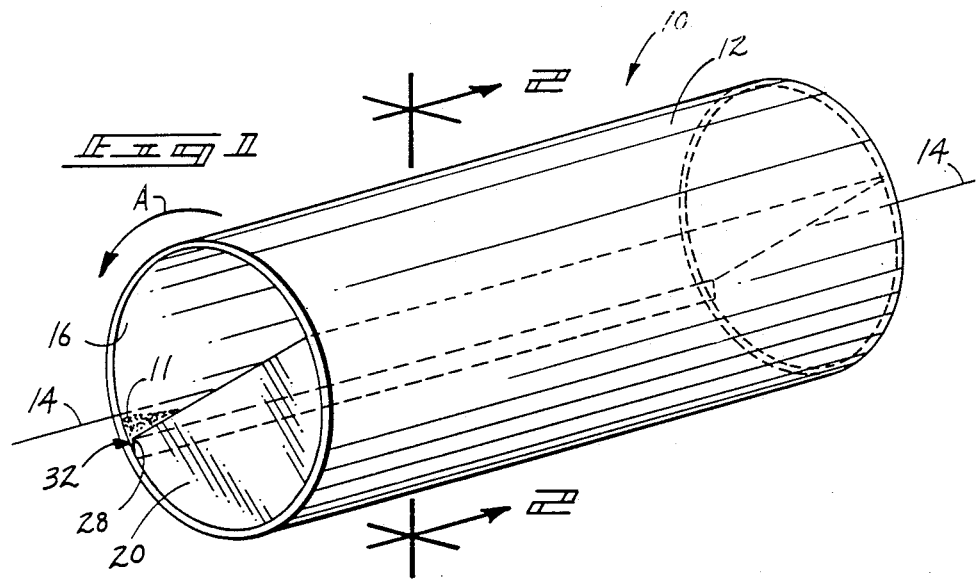
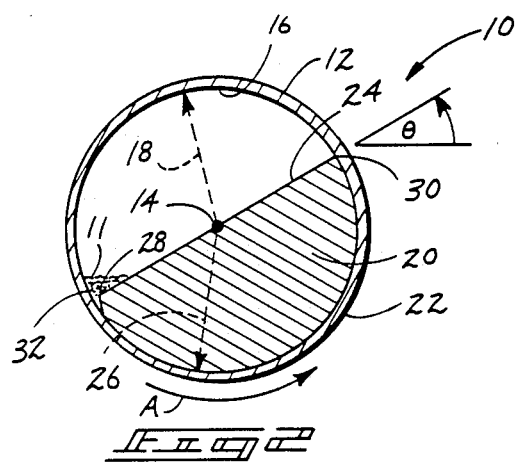
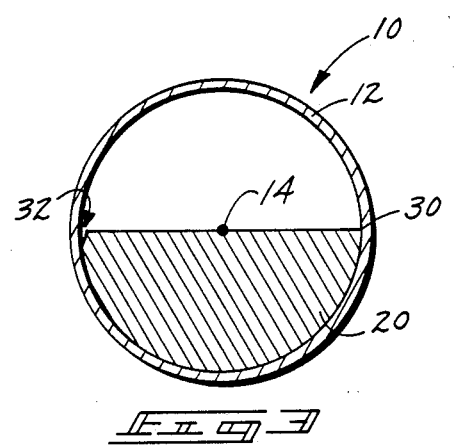

ENHANCEMENT OF THE MECHANICAL PROPERTIES BY GRAPHITE FLAKE ADDITION

TECHNICAL FIELD

This invention relates generally to reinforcement of polymers, and to apparatus for shear grinding platy solid materials into thin flakes.

BACKGROUND ART

At present, there are hundreds of polymers that are used in a wide variety of products. These polymer materials differ in their molecular composition and construction, and consequently in their physical properties such as melting point, strength, stiffness, etc. The molecular level differences produce differences in the way in which these materials must be processed in order to produce useful finished products. Generally higher performance polymers capable of exposure to extreme environments are expensive and relatively difficult to shape.

Polymers can be used in their relatively pure form in producing useful articles, or also as the matrix phase in composite materials. Such composite materials typically comprise a matrix phase and a reinforcement phase. With most composites, it is desired that the finished material possess structural and other mechanical properties typical of metal.

To achieve the desired structural properties, the reinforcement phase is typically maximized and is comprised of a fibrous reinforcing material. The orientation of the reinforcement fibers is usually controlled to produce the highest strength and stiffness of the finished material in the desired direction or directions. Various filler materials can also be added to pure polymers or polymer composites to increase durability, or simply to decrease the amount of the relatively more expensive polymer which is used. These fillers are usually roughly spherical in shape, and do not function well as reinforcements because the spherical shape does not allow much load transfer by shear.

Graphite fiber is one material that has been added to polymers for reinforcement. Examples of finished products incorporating polymers and graphite fibers are golf club shafts, fishing rods, etc. The graphite material in such products is typically comprised of long fibers which are woven and specifically oriented within the material to maximize strength or flexibility in a given direction.

The primary intent of this invention was to create stronger polymer composite materials at reduced cost. Other advantages may be achievable by practice of the various aspects of the invention as will be appreciated by the artisan.

BRIEF DESCRIPTIONS OF THE DRAWINGS

A preferred embodiment of one aspect of the invention is illustrated in the accompanying drawings, in which:

FIG. 1 is a perspective view of an apparatus for shear grinding of platy solid material into thin flakes in accordance with one aspect of the invention. The apparatus is illustrated in an operating rotational state.

FIG. 2 is a cross-sectional view taken along line 2—2 in FIG. 1 as the apparatus is rotating.

FIG. 3 is a cross-sectional view as would typically appear if taken along line 2—2 when the apparatus was in a stationary, non-rotational state.

DETAILED DESCRIPTION OF PREFERRED EMBODIMENTS AND BEST MODES FOR CARRYING OUT THE INVENTION

The following disclosure of the invention is submitted in compliance with the constitutional purpose of the Patent Laws "to promote the progress of science and useful arts" (Article 1, Section 8).

Compositions in accordance with the invention comprise a polymer and a flake reinforcing material distributed therethrough in an effective amount to structurally reinforce the polymer. Individual flakes of the flake material (a) are less than or equal to 1,000 Angstroms in thickness, (b) have an aspect ratio (largest dimension/smallest dimension) greater than or equal to 100, and (c) preferably are significantly randomly oriented throughout the polymer as opposed to being deliberately aligned or configured in some organized manner. It is anticipated that any of a wide variety of platy solid materials that can be ground into thin flakes can function as the flake reinforcing material. Examples of such materials include graphite, mica and talc flakes. Further examples of workable materials might include glass flakes, certain platy clays such as kaolinite, and certain platy metal ores such as $MoS_2$ and $ZnS$. Actual reduction to practice at this writing has been demonstrated with graphite flakes.

The effective amount of flake reinforcing material in the composition is preferably anywhere from 5 to 50 volume percent, with volume percents in the lower portion of this range being most preferred. The thickness of individual flakes will typically fall between 100 and 1,000 Angstroms, with a flake thickness of less than or equal to 500 Angstroms being preferred. Graphite flake is the preferred reinforcing flake material additive in terms of its strength, stiffness, low density and low cost. It is anticipated that with a 10 volume percent inclusion of graphite flakes in inexpensive polymers, such as polyethylene or polypropylene, the stiffness of the finished product will approach that of aluminum. Although graphite flakes are very strong along two directions, they are very weak and subject to shear in a third. Accordingly, the flakes should be as thin as possible to preclude development of large shear forces across them in use.

Similarly, the flakes should typically not be deliberately aligned in the polymer, but rather should be significantly randomized to avoid weakness in the finished product in any one direction. As "randomness" is a matter of degree, the terminology "significantly random" is used. This terminology is intended to imply any degree of flake randomness having a desired effect of contributing to strength and isotropy in the finished material. If anisotropy in the finished material were desired, the flakes could be suitably oriented to produce the desired properties in the desired directions in the finished composite.

Thin graphite flakes less than 1,000 Angstroms in thickness and having an aspect ratio in excess of 100 could be produced by a number of different methods. For example, the anisotropy in the strength of a graphite crystal makes it relatively easy to grind into thin flakes by ball-milling techniques. For greatest efficiency, a simple and relatively volatile hydrocarbon, such as octane, is preferably used during milling. The purpose of the hydrocarbon is to cover newly exposed surfaces that result from the shearing to prevent possible recombination of individual flakes. Natural graphite has been ball milled into flakes 400 Angstroms thick and 7 microns in the remaining two dimensions, which provides an aspect ratio of approximately 175. Other methods, such as ultrasonic vibration or by an exfoliation/intercalation process might also be usable in producing thin high aspect ratio flakes for use in accordance with the invention. An inventive method and apparatus for producing such thin flakes will be described below.

Structural reinforcement of polymers by graphite flake addition has been demonstrated. Two identical size cantilever beams were fabricated from DER 332 epoxy resin, manufactured by Dow Chemical. One beam consisted essentially of the pure epoxy, while the other contained approximately 10 to 11 volume percent of randomly distributed graphite flakes that had been ball-milled to approximately 450 Angstroms thick, and having an aspect ratio of approximately 170. When the two cantilever beams were mechanically loaded with weights, there was a dramatic difference in the deflections. Using the measured deflections, it was calculated that the graphite flake reinforced beam was 42 times as stiff as the non-reinforced beam.

FIGS. 1-3 diagrammatically illustrate a shear grinding apparatus 10 useful for grinding a platy material 11 into thin, high aspect ratio flakes. Apparatus 10 comprises a cylindrical shearing drum 12 having a longitudinal axis 14. Shearing drum 12 includes a cylindrical internal surface 16 formed about a first predetermined radius of curvature represented by arrow 18 (FIG. 2). Shearing drum 12 would be mounted or otherwise supported (not shown) for rotation about its longitudinal axis 14.

A shear grinder 20 is freely received within cylindrical drum 12, and rests on a bottom internal surface thereof. Shear grinder 20 has an external surface formed about a second predetermined radius Of curvature, with the second radius of curvature being slightly less than the first radius of curvature. Both shear grinder 20 and the internal surface of drum 12 would be constructed of a hard material, such as alumina. The external surface of grinder 20 and internal surface of drum 12 would be ground smooth during manufacture, and polished even smoother during grinding operation.

More particularly, shear grinder 20 is solid and generally hemicylindrical, having external surfaces defined by an arcuate surface 22 and a non-arcuate, or planar, surface 24. Arcuate surface 22 has a second predetermined radius of curvature, indicated by arrow 26 (FIG. 2), and joins with planar surface 24 at first and second generally diametrically opposed locations 28, 30. Cylindrical drum 12 is mounted for rotation in a first direction 'A'. First location 28 where arcuate surface 22 joins with planar surface 24 precedes second location 30 in direction of rotation 'A'. Arcuate surface 22 includes a tapered or recessed leading nose portion 32 at location 28. Its purpose is described below. Grinder 20 is preferably freely received within drum 12 or isolated from rotating therewith to enable sliding of surfaces 16 and 22 against one another.

FIG. 3 illustrates the relationship of drum 12 and shear grinder 20 in a resting position where shearing drum 12 is not rotating. FIGS 1 and 2 illustrate the relationship of drum 12 and shear grinder 20 when drum 12 rotates in direction 'A' at some predetermined rotational speed. As drum 12 rotates in direction 'A', shear grinder 20 tends to ride-up along internal drum surface 16 until some angle theta from horizontal is reached. Angle theta is a function of the friction coefficient and speed of the system for a given material that is being sheared. At angle theta, the mass of the shear grinder overcomes the frictional relationship of the system, which causes shear grinder 20 to effectively slide relative to the moving internal surface 16 of drum 12. This shears the graphite or other platy material 11 trapped between external surface 22 of shear grinder 20 and internal surface 16 of drum 12. The greatest or most efficient shearing for a given batch is expected to occur at or near the maximum rotational speed of drum 12 where shear grinder 20 still does not rotate with drum 12.

As illustrated, shear grinder 20 is preferably hemicylindrical as opposed to being completely cylindrical. This lowers the center of gravity of the shear grinder and minimizes any tendency of the grinder to roll with shearing drum 12, as opposed to sliding with respect thereto. A tapering recessed portion is preferably provided in the grinder when the grinder is less than entirely cylindrical. The recessed portion, such as nose 28 in grinder 20, is positioned in the direction of anticipated rotation at the location where the arcuate cylindrical surface deviates from its standard curvature. The recess facilitates drawing of the platy material into the sliding grinding area between the drum and grinder as the drum rotates.

As mentioned above, the radius of curvature of external surface 22 of grinder 20 is preferably only slightly less than the radius of curvature of internal surface 16 of drum 12. This will provide a rather large shear grinding area of contact between drum 12 and grinder 20. Most preferably, the grinder radius is at least 99.0 percent of the inside radius of the drum. For example, a grinder radius of about 6.0 inches would preferably be employed with a drum having a radius of 6.005 inches. Where the difference between the two radiuses of curvature is significantly greater than this, the area of contact between the drum and grinder reduces to a mere line of contact as opposed to an area. This adversely affects the grinding efficiency and will tend to enable the grinder to flop around inside the drum as it rotates. Constructions with a grinder radius less than 99.0 percent of the drum radius might also be possible without departing from the principles and scope of the invention. However, an adverse effect on efficiency should be anticipated.

Apparatus in accordance with this aspect of the invention enable shearing of platy material along its planes of weakness into thin flakes of high aspect ratio. As with the ball-milling technique described above, a simple and relatively volatile hydrocarbon is preferably combined with the platy material (at least preferably with graphite) when shear grinding.

In compliance with the statute, the invention has been described in language more or less specific as to structural and compositional features. It is to be understood, however, that the invention is not limited to the specific aspects shown and described, since the means and construction herein disclosed comprise preferred forms of putting the invention into effect. The invention is, therefore, claimed in any of its forms or modifications within the proper scope of the appended claims, appropriately interpreted in accordance with the doctrine of equivalents.

I claim:

1. A composition of improved strength comprising:
   a polymer; and
   a flake reinforcing material distributed throughout the polymer in a effective amount to significantly structurally reinforce the polymer, individual flakes of the flake reinforcing material
   (a) being less than or equal to 1000 Angstrom in thickness,
   (b) having an aspect ratio greater than or equal to 100, and
   (c) being significantly randomly oriented throughout the polymer; the composition being of significantly higher strength than the polymer without such flake reinforcing material.

2. The composition of claim 1 wherein the flake reinforcing material comprises graphite.

3. The composition of claim 1 wherein the effective amount of flake reinforcing material is from 5 to 50 volume percent.

4. The composition of claim 1 wherein the thickness of individual flakes of the flake reinforcing material is between approximately 100 and 1000 Angstroms.

5. The composition of claim 1 wherein the thickness of individual flakes of the flake reinforcing material is less than or equal to 500 Angstroms.

6. The composition of claim 1 wherein the flake reinforcing material comprises graphite which is present in an effective amount of from 5 to 50 volume percent.

7. The composition of claim 6 wherein the thickness of individual flakes of the flake reinforcing material is between approximately 100 and 1000 Angstroms.

8. The composition of claim 6 wherein the thickness of individual flakes of the flake reinforcing material is less than or equal to 500 Angstroms.

9. The composition of claim 1 wherein the effective amount of flake reinforcing material is from 5 to 50 volume percent, and the thickness of individual flakes of such reinforcing material is between approximately 100 and 1000 Angstroms.

10. The composition of claim 1 wherein the flake reinforcing material comprises mica.

11. The composition of claim 10 wherein the effective amount of mica is from 5 to 50 volume percent.

12. The composition of claim 10 wherein the thickness of individual mica flakes is between approximately 100 and 1000 Angstroms.

13. The composition of claim 10 wherein the thickness of individual mica flakes is less than or equal to 500 Angstroms.

14. The composition of claim 10 wherein,
   the effective amount of mica is from 5 to 50 volume percent; and
   the thickness of individual mica flakes is less than or equal to 500 Angstroms.

15. The composition of claim 1 wherein the flake reinforcing material is selected from the group consisting of glass flakes, clay flakes produced from platy clays, flakes produced from metal ores, and talc flakes.

16. A method for improving the strength of a polymer comprising:
   combining a polymer with an effective amount of a flake reinforcing material to form a mixture, the flake reinforcing material being significantly randomly oriented throughout the mixture, the effective amount of flake reinforcing material being sufficient to significantly structurally reinforce the polymer, individual flakes of the flake reinforcing material
   (a) being less than or equal to 1000 Angstroms in thickness, and
   (b) having an aspect ratio greater than or equal to 100; and
   allowing the mixture to harden into a solid reinforced polymer product.

17. The method of claim 16 wherein the effective amount of flake reinforcing material is from 5 to 50 volume percent.

18. A reinforced polymer produced according to the method of claim 16.

19. A reinforced polymer produced according to the method of claim 17.

* * * * *